No. 854,804. PATENTED MAY 28, 1907.
J. C. CORDREY & P. J. BRADY.
TROLLEY WHEEL.
APPLICATION FILED JUNE 30, 1906.

Witnesses:
Robert H. Weir
Ira P. Perry

Inventors:
John C. Cordrey
Patrick J. Brady
By Cheever & Cox
attys.

UNITED STATES PATENT OFFICE.

JOHN C. CORDREY, OF LA JUNTA, COLORADO, AND PATRICK J. BRADY, OF HARVEY, ILLINOIS; SAID BRADY ASSIGNOR TO GEORGE S. CODLING, OF CHICAGO, ILLINOIS.

TROLLEY-WHEEL.

No. 854,804.  Specification of Letters Patent.  Patented May 28, 1907.

Application filed June 30, 1906. Serial No. 324,217.

*To all whom it may concern:*

Be it known that we, JOHN C. CORDREY, a citizen of the United States, residing at La Junta, county of Otero, State of Colorado, and PATRICK J. BRADY, a citizen of the United States, residing at Harvey, county of Cook, and State of Illinois, have invented a certain new and useful Improvement in Trolley-Wheels, of which the following is a specification in the best form now known to us, reference being had to the accompanying drawing, in which similar numerals pertain to similar parts throughout the several views.

Our invention relates to wheels for use upon the ends of trolleys of electric vehicles to secure electrical connection between the electric conductor or conductors contained in the trolley and the trolley wire.

The object of our invention is to provide a novel construction of trolley wheel which is not easily worn by the pressure of the wheel against the trolley wire or rail and which is at the same time in good electrical contact with the trolley wire and therefore readily connects the trolley wire to the trolley without undue electrical resistance and consequent loss of electrical energy.

Our invention consists broadly in making the trolley wheel of two different metals one of them being a good electrical conductor such as brass, the other being a metal such as steel or cast iron which readily resists wear, the wear resisting metal being at the bottom of the V in the trolley wheel rim against which the wire bears as the wheel is used.

More in detail our invention consists in a novel form of construction of the wear resisting part of the wheel and in its placement within the electrical conducting part of the wheel.

It further consists in details of construction which will be hereafter more fully described and claimed as the specification proceeds.

Figure 1:
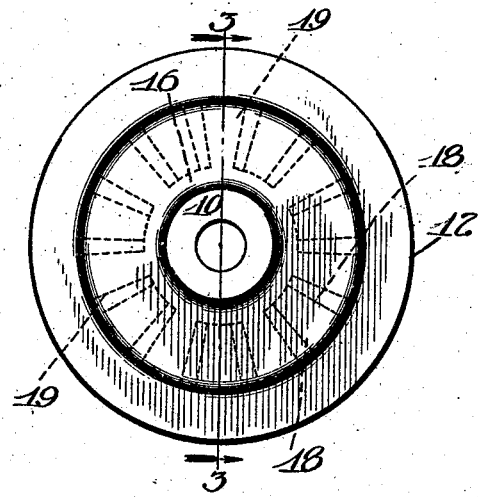
Figure 2:
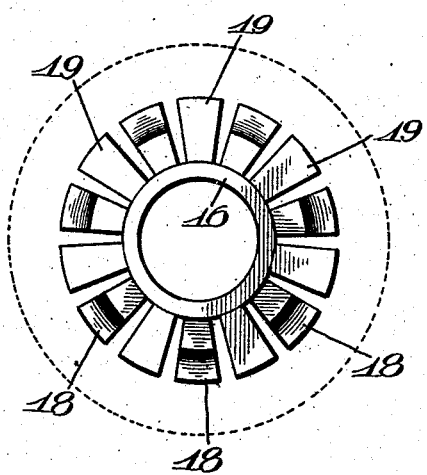
Figure 3:
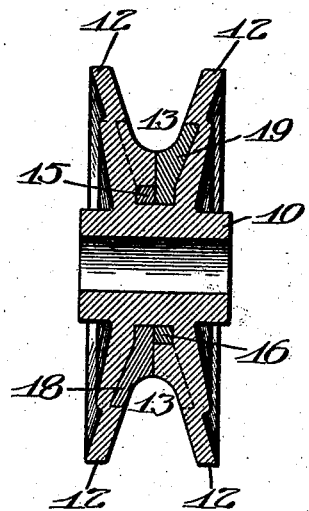
Figure 4:
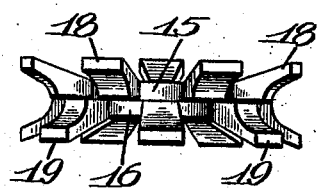

Again referring to the drawings: Figure 1 is a side view of a wheel embodying our invention, the interior construction being shown in dotted lines. Fig. 2 is a side view of the two wear resisting parts of the wheel placed in their proper position with reference to each other but without the brass or other electrical conducting outer portion of the wheel. Fig. 3 is a sectional side view of the wheel taken on lines 3—3 of Fig. 1. Fig. 4 is a plan view of the part shown in Fig. 2.

Again referring to the drawings numeral 10 indicates the hub of the trolley wheel made as heretofore stated of brass or other good electrical conducting material having cut in its circumference 12 the V shaped notch 13 in which the trolley wire, not shown, is adapted to bear. In order to provide against undue wear in the bottom of this V 13 we embed in the wheel in the course of manufacture usually by casting two annular rings 15 and 16. Each of these rings 15 and 16 has extending from its circumference the same number of equal spaced radial teeth or arms 18 and 19 respectively. These teeth or arms 18 and 19 are all of such equal lengths that, as is best shown in Fig. 3, they each extend up to the level of the bottom of the V 13 in the wheel rim heretofore described.

In order that the trolley wire may at all times have a bearing against one of the wear resisting arms 18 or 19 and may at the same time always be in good contact with the brass of the wheel proper, we place the respective rings 15 and 16 so that their respective arms are as best shown in Figs. 2 and 4 staggered with reference to each other. The result of this is that the brass of the wheel proper fills in the space between two of the radial arms as 19 of one annular ring directly opposite to the arm 18 of the opposite ring and that the space between each pair of arms 18 of the second mentioned ring is filled in with brass opposite to the wear resisting arm 19 of the first ring.

From this description and the drawings it will be seen that the trolley wire at its point of line of contact in the V shaped annular recess 13 in the trolley wheel is substantially all the time in contact with one radial arm of the resisting material and the portion of brass filling in between the two arms of the opposite ring to which said first arm is adjacent with the result that the trolley wheel is always in contact with a wear resisting arm and an electrical conducting portion of brass. This with the result that wear in the V 13 is prevented without impairing the electrical conductivity of the wheel.

Having thus described our invention what we claim as new and desire to secure by Letters Patent is:

1. As an article of manufacture a trolley wheel having in its circumference a V shaped recess for the trolley wire there being embedded in the material of the wheel proper around the circumference of the base of said V a plurality of portions of wear resisting material said portions of wear resisting material being staggered with each other upon opposite sides of the central plane of the wheel.

2. As an article of manufacture a trolley wheel comprising two annular rings having projecting from them radial arms as described, the arms upon opposite rings being made of wear resisting material and staggered with reference to each other as described, said rings and arms of wear resisting material being embedded in a wheel portion proper of conducting material as described, the whole being so arranged that the wearing portions of said arms come just at the bottom of the circumferential V shaped recess for the trolley wire in the face of the wheel.

JOHN C. CORDREY.
PATRICK J. BRADY.

Witnesses to signature John C. Cordrey:
    WALTER G. BARRON,
    JULIAN F. CORDREY.
Witnesses to signature Patrick J. Brady:
    EDWARD J. GREEN,
    DANIEL BRADLEY.